United States Patent
Kwiatkowski et al.

(10) Patent No.: US 11,598,388 B2
(45) Date of Patent: Mar. 7, 2023

(54) ADAPTIVE ENERGY ABSORBER FOR STRUCTURAL ISOLATION AND INJURY MITIGATION

(71) Applicant: PRATT & MILLER ENGINEERING AND FABRICATION, INC., New Hudson, MI (US)

(72) Inventors: Kevin Rudolph Kwiatkowski, Ann Arbor, MI (US); Christopher James Watson, Ferndale, MI (US); Andrew Nathan Suchezky, South Lyon, MI (US)

(73) Assignee: PRATT & MILLER ENGINEERING AND FABRICATION, LLC, New Hudson, MI (US)

( * ) Notice: Subject to any disclaimer, the term of this patent is extended or adjusted under 35 U.S.C. 154(b) by 807 days.

(21) Appl. No.: 16/562,653

(22) Filed: Sep. 6, 2019

(65) Prior Publication Data

US 2021/0071734 A1    Mar. 11, 2021

(51) Int. Cl.
*F16F 9/504* (2006.01)
*F16F 9/34* (2006.01)
(Continued)

(52) U.S. Cl.
CPC .............. *F16F 9/504* (2013.01); *B62D 24/04* (2013.01); *B62D 25/2009* (2013.01);
(Continued)

(58) Field of Classification Search
CPC .. F16F 9/504; F16F 9/182; F16F 9/185; F16F 9/34; F16F 9/062; F16F 9/065;
(Continued)

(56) References Cited

U.S. PATENT DOCUMENTS

| 2,869,685 A | 1/1959 | Funkhouser et al. |
| 3,127,958 A | 4/1964 | Szostak |

(Continued)

OTHER PUBLICATIONS

International Search Report and Written Opinion of PCT/US2020/049043, dated Nov. 10, 2020.

*Primary Examiner* — Thomas W Irvin
(74) *Attorney, Agent, or Firm* — Dickinson Wright PLLC (57) ABSTRACT

An energy absorbing strut having, a first end coupled with an inner cylinder, and a second end connected with a hollow rod extending within the inner cylinder. A piston is carried by the rod having an outer surface sealing against an inside diameter of the inner cylinder and forming a compression chamber and a rebound chamber bounded by the piston, the rod having an internal passageway communicating between the compression chamber and the rebound chamber. An inertial mass carried by the rod movable axially on the rod between a closed position against and annular rod passageway and an open position opening the rod passageway and allowing the flow of a hydraulic fluid between the compression chamber and the rebound chamber. A spring acts on the inertial mass biasing the inertial mass toward the closed position. The energy absorbing strut may be used in a blast mitigation system for a military vehicle or other applications for providing shock isolation between two structures.

29 Claims, 12 Drawing Sheets

(51) Int. Cl.
*F16F 9/18* (2006.01)
*F16F 13/00* (2006.01)
*B62D 24/04* (2006.01)
*B62D 25/20* (2006.01)
*B62D 27/04* (2006.01)
*B64D 7/00* (2006.01)
*B63B 59/00* (2006.01)
*F41H 11/00* (2006.01)
*F16F 9/06* (2006.01)

(52) U.S. Cl.
CPC ............. *B62D 27/04* (2013.01); *B63B 59/00* (2013.01); *B64D 7/00* (2013.01); *F16F 9/182* (2013.01); *F16F 9/185* (2013.01); *F16F 9/34* (2013.01); *F16F 13/007* (2013.01); *F41H 11/00* (2013.01); *F16F 9/062* (2013.01); *F16F 9/065* (2013.01); *F16F 2222/12* (2013.01); *F16F 2228/066* (2013.01); *F16F 2230/16* (2013.01)

(58) Field of Classification Search
CPC .. F16F 13/007; F16F 2222/12; F16F 2222/08; F16F 2228/066; F16F 2230/16; B62D 24/04; B62D 25/2009; B62D 27/04; B63B 59/00; B64D 7/00; F41H 11/00
See application file for complete search history.

(56) References Cited

U.S. PATENT DOCUMENTS

| | | | |
|---|---|---|---|
| 3,656,633 A | 4/1972 | Ostwald | |
| 4,781,363 A | 11/1988 | Braun | |
| 5,273,240 A | 12/1993 | Sharon | |
| 5,285,875 A * | 2/1994 | Munoz | F16F 9/504 188/315 |
| 5,332,068 A | 7/1994 | Richardson et al. | |
| 5,462,140 A * | 10/1995 | Cazort | F16F 9/504 188/375 |
| 5,823,305 A * | 10/1998 | Richardson | F16F 9/464 188/275 |
| 5,954,167 A * | 9/1999 | Richardson | F16F 9/464 188/275 |
| 6,105,987 A * | 8/2000 | Turner | F16F 9/006 280/279 |
| 6,253,889 B1 * | 7/2001 | Shirley | F16F 9/3228 188/275 |
| 7,128,192 B2 | 10/2006 | Fox | |
| 7,261,194 B2 * | 8/2007 | Fox | F16F 9/34 188/314 |
| 7,766,135 B2 | 8/2010 | Fox | |
| 8,104,591 B2 * | 1/2012 | Barefoot | F16F 9/461 188/282.7 |
| 8,342,300 B2 | 1/2013 | Guillon | |
| 8,607,942 B2 | 12/2013 | Becker et al. | |
| 8,727,080 B2 * | 5/2014 | Barefoot | F16F 9/461 188/282.7 |
| 8,978,846 B2 * | 3/2015 | McAndrews | B62K 25/04 188/282.8 |
| 9,580,134 B2 * | 2/2017 | McAndrews | F16F 9/504 |
| 2007/0034464 A1 * | 2/2007 | Barefoot | F16F 9/34 188/322.15 |
| 2007/0080515 A1 | 4/2007 | Mc Andrews | |
| 2012/0160622 A1 * | 6/2012 | Barefoot | F16F 9/34 188/282.1 |
| 2019/0271375 A1 | 9/2019 | Fox | |

* cited by examiner

ADAPTIVE ENERGY ABSORBER FOR STRUCTURAL ISOLATION AND INJURY MITIGATION

GOVERNMENT LICENSE RIGHTS

This invention was made with United States Government support provided by the Department of Defense under contract number W56HZV-17-C-0013. The United States Government has certain rights in the invention.

FIELD OF THE INVENTION

This invention relates to an energy absorbing device for multiple potential applications. In one application, the device may be used for a military vehicle for reducing injuries to vehicle occupants in underbody blast events.

BACKGROUND

Certain military vehicles used as personnel carriers may be subject to explosive attacks such as those from an improvised explosive device (IED) detonated below the vehicle as it traverses the location where such a device is buried. Manufacturers of military vehicles seek to enhance protection afforded to military personnel operating in hostile combat environments. Injuries to personnel seated within the vehicle in response to a blast arise from numerous factors. One area for blast injury mitigation is by controlling the acceleration forces acting on the occupant seated in a personnel seat structure. In one design arrangement, a seat structure is mounted to the hull of the vehicle and energy absorbing elements are placed between the hull and the seat to control acceleration forces transmitted between the vehicle and the seat caused by an under-vehicle detonation. Another injury mitigation step is in controlling acceleration of the vehicle floor structure which support the lower extremities of the occupants in response to an under-vehicle explosion.

The present invention is related to an energy absorbing strut element which can be used in multiple applications. One application is mentioned above for acting between a vehicle hull and a floor structure for attenuating acceleration forces acting on the occupant's lower extremities caused by an explosive device detonation below the vehicle.

For any device having the above applications; reliability, cost and reusability are important considerations. Vehicle operations in hostile theaters can result in successive blast or acceleration events occurring in a short time. For example, after an IED explosion, the vehicle may be subjected to further dynamic conditions such as returning to ground. Ideally these energy absorbing systems are passive in the sense of not requiring control inputs, are reusable and can operate over a range of input parameters, for example, blast characteristics, and occupant characteristics such as occupant mass and personnel equipment load.

Various energy absorbing systems may be candidates for the above applications. In accordance with the present invention, an energy absorber (EA) device is provided that automatically adapts to target a constant acceleration over its linear stroking displacement. This allows, in the above-described application, the vehicle floor response to be independent of the system mass which, in turn, gives adaptability for the blast characteristics as well as variations of occupant mass and equipment loading. Additional potential applications for an energy absorbing device in accordance with this invention include but are not limited to; injury-mitigating blast seats, impact absorbing seats for, watercraft, aircraft or rotorcraft crash or for off-road use, cargo handling e.g. in vehicle or air-dropped, and suspension systems e.g. off-road vehicles.

SUMMARY

In accordance with embodiments of the present invention, an energy absorbing strut is provided having internal components which provides variable damping and spring rate characteristics. One significant feature is the provision of an internal inertial responsive valve member which responds to dynamic inputs and shuttles to regulate the flow of hydraulic fluid within the strut as a function of input acceleration.

DETAILED DESCRIPTION

Figure 1:
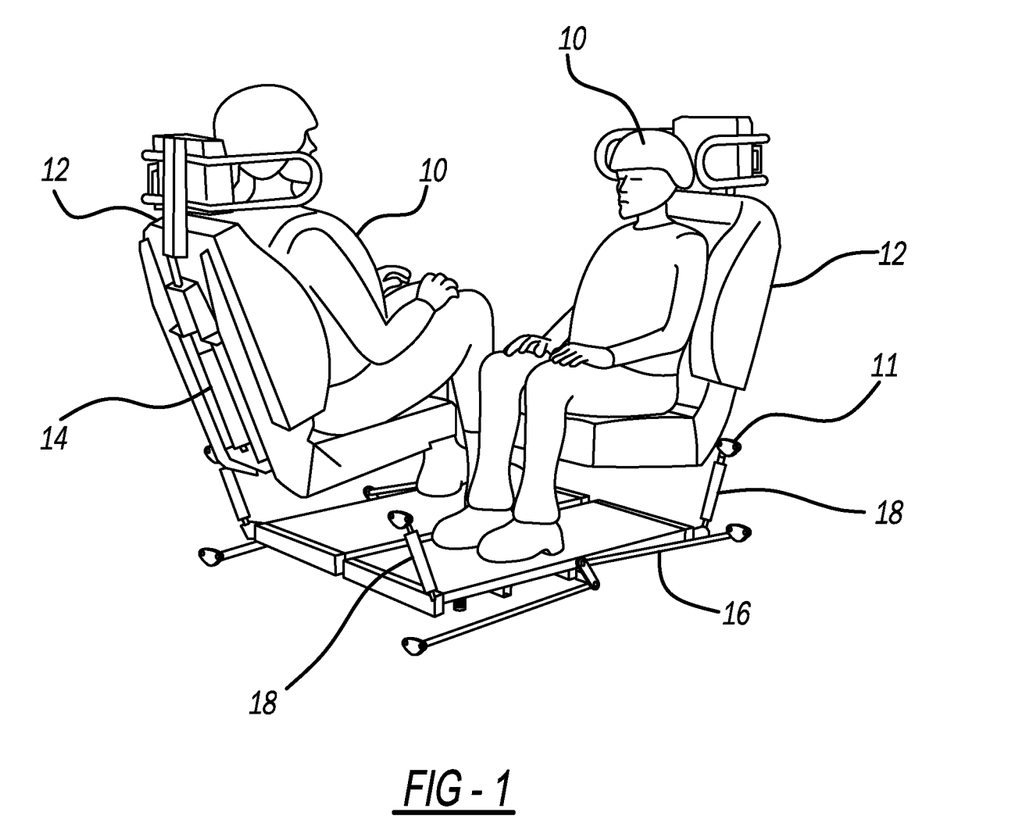
FIG. 1 is a diagrammatic view of an interior of a representative military vehicle showing a pair of seated occupants.

FIG. 1 provides a general illustration of one potential application of the energy absorbing device in accordance with the present invention. FIG. 1 shows a seating arrangement in a representative military vehicle in the form of a personal carrier. In this case, a pair of occupants 10 are shown seated across and offset from one another. Here, occupants 10 are represented by Hybrid III anthropomorphic test devices (ATD). These ATDs are instrumented and provided a high degree of biofidelity based on known human impact tolerance characteristics. Since the system needs to accommodate a range of occupant characteristics, one of the occupants 10 is identified here as a 95th percentile male Grenadier and the other as a 5th percentile female Grenadier as representative occupant. Both occupants 10 are positioned in seat assemblies 12. The hull of the vehicle is not shown but the seat back of the seat assembly 12 is, in one vehicle design, mounted to the hull by an energy absorbing device 14 which helps control acceleration forces acting on the upper torso, pelvis, spine and head of the occupants. Also shown is floor structure 16 which supports the lower extremities of the occupants. In this case, a series of energy absorbing struts 18 are provided which extend between mounting points on floor structure 16 and the vehicle hull.

In an under-vehicle blast event, the vehicle hull is accelerated in an upward direction and in order to control forces acting on the floor structure 16 and the occupant's lower extremities, the energy absorbing struts 18 extend in a manner which is described in greater detail below. This extension is provided as a measure to reduce acceleration forces acting on the occupants lower extremities to within human tolerance limits. The present invention is an energy absorbing (EA) strut 18 especially adapted for supporting the floor structure and the application described above. However, potential applications of EA strut 18 are much broader and the device has potential applications were energy absorption capabilities are desired using a passive device (i.e. unpowered) capable of responding over a range of dynamic input characteristics. In the described embodiments EA strut 18 is normally in a compressed condition. In the event of a blast event, EA strut 18 extends providing energy absorbing displacement. In other applications this configuration can be reversed with the unit normally beginning in an extended or fully extended condition with energy absorption occurring during a collapsing of the unit. Certain internal components of strut 18 would be modified in a matter apparent to persons having skill in the art in view of the teachings of the embodiments described herein.

Figure 2A:
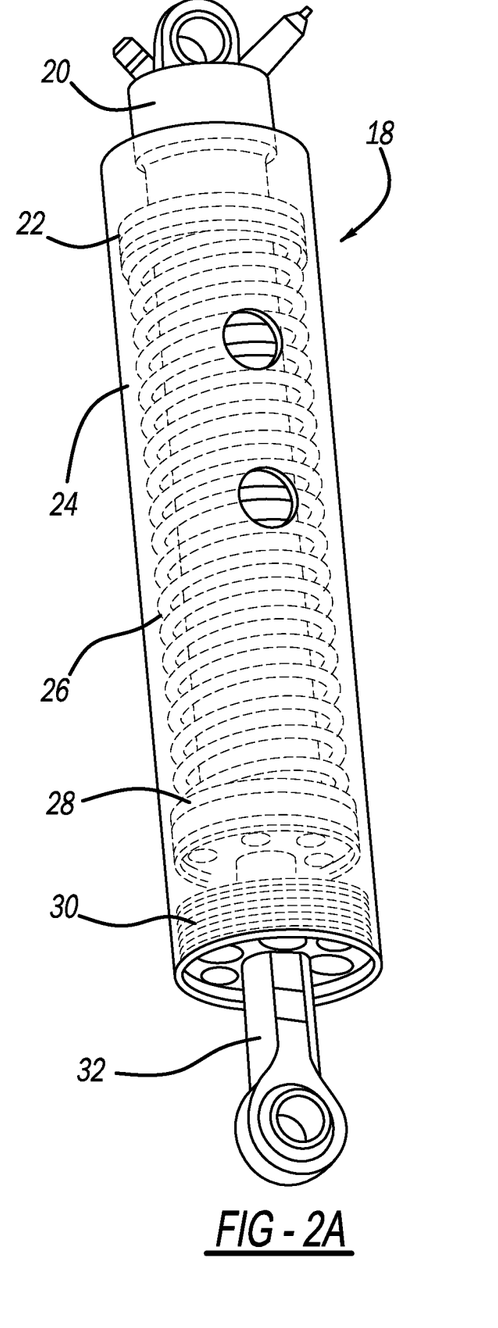
FIGS. 2A and 2B show a strut unit in a resting condition shown in a phantom pictorial view (2A) and in a longitudinal cross-sectional view (2B).
Figure 2B:
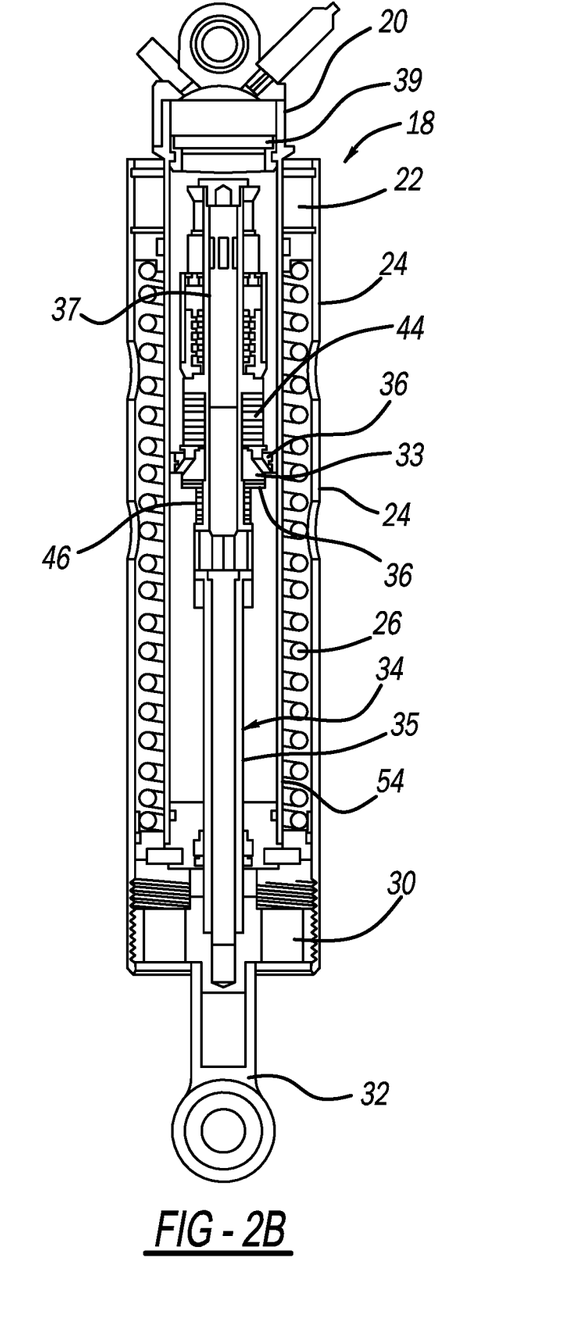
Figure 3A:
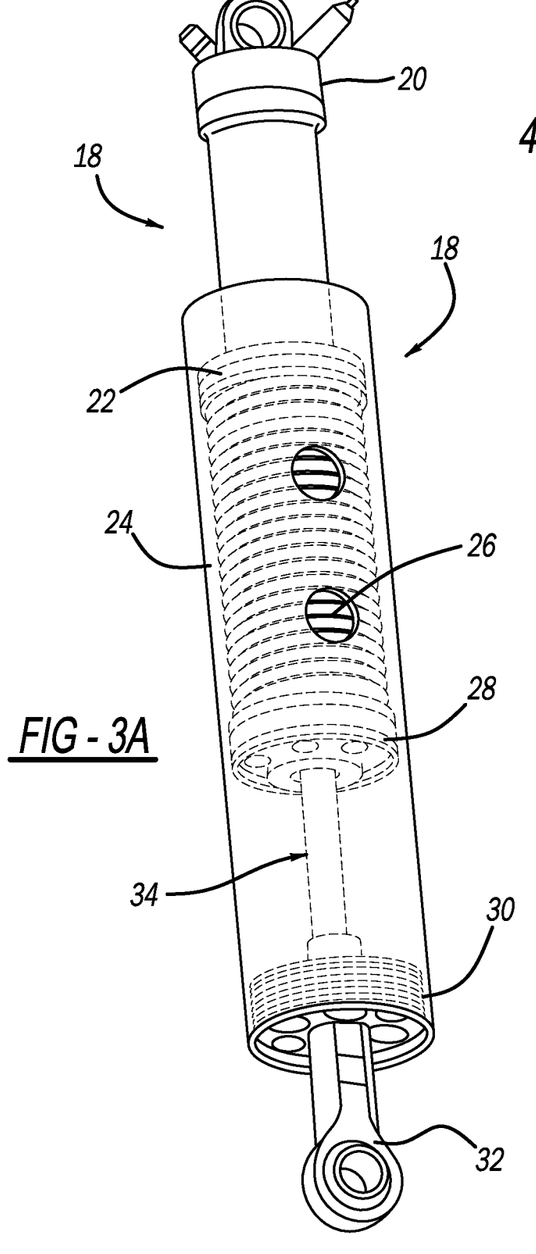
FIG. 3A shows a strut unit in an extended condition in a phantom pictorial view and FIG. 3B shows the strut in a compressed condition in a longitudinal cross-sectional view.
Figure 3B:
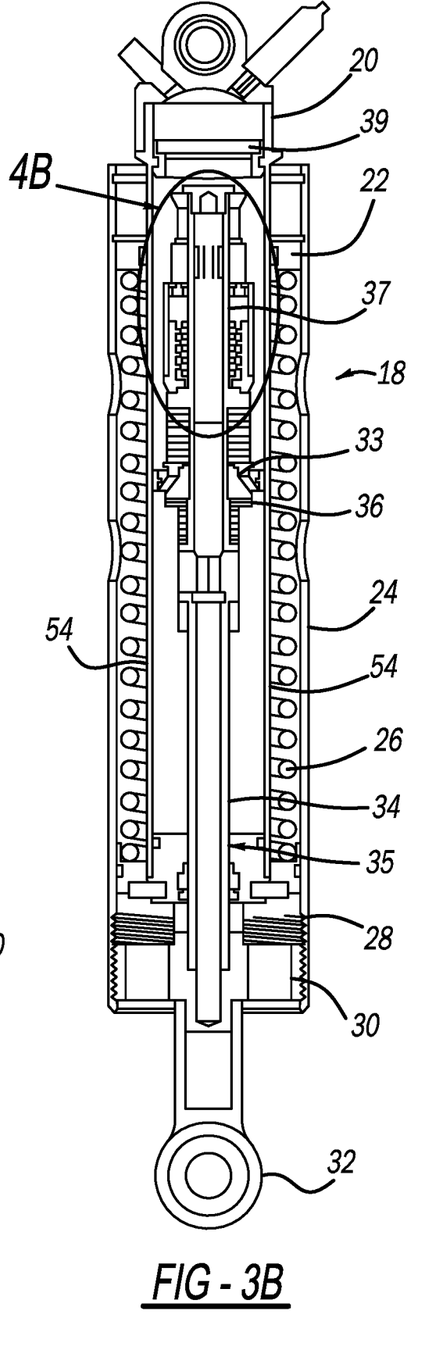

FIGS. 2A and 2B illustrate EA strut 18 in accordance with the present invention in a resting state. FIG. 2A shows some of the principal components of EA strut 18, including shock cap 20, upper sleeve bearing 22, outer sleeve 24, return spring 26, lower sleeve bearing 28, rod end adapter 30, and rod end 32. FIG. 3A shows strut 18 in an extended condition.

Figure 4A:
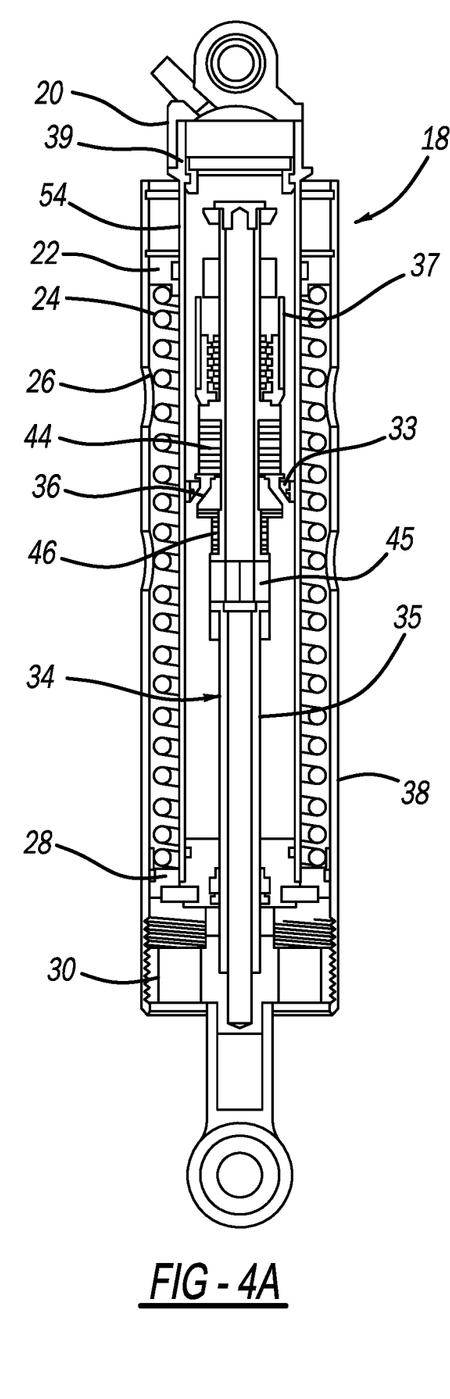
FIG. 4A is a cross-sectional view showing additional components of the strut.
Figure 4B:
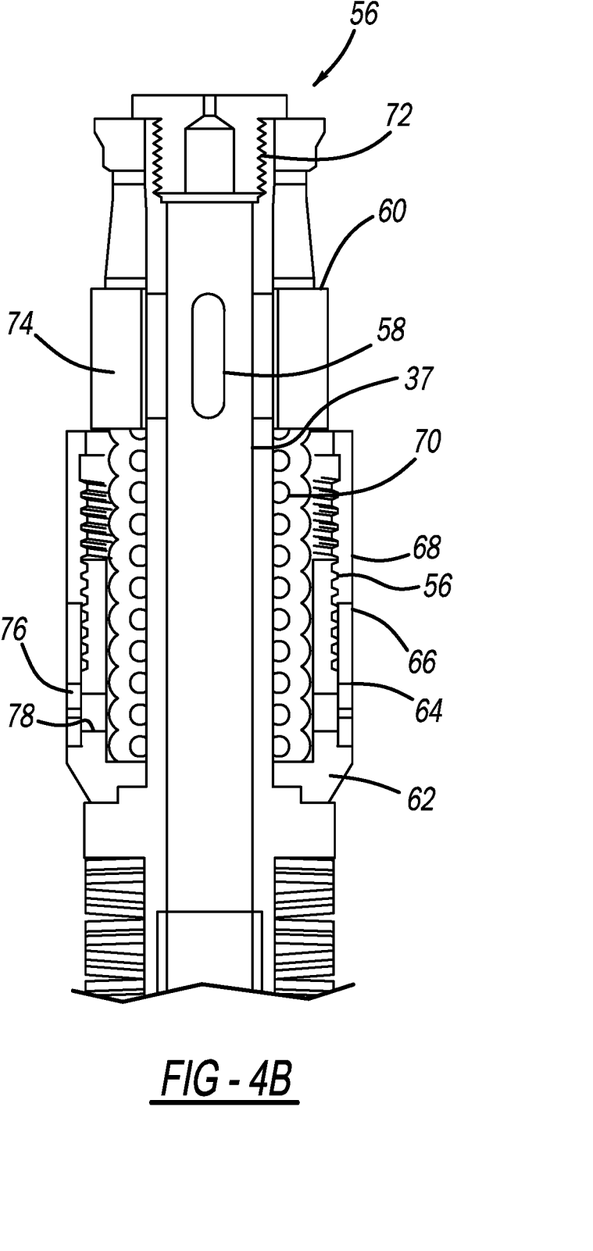
FIG. 4B is an enlarged cutaway view from FIG. 4A.

FIGS. 4A and 4B show additional internal components of EA strut 18. Shaft 34 extends upwardly from rod end 32 and extends concentrically within the unit. Shaft 34 is divided into two sections including lower shaft 35 and upper shaft 37. Shock body 54 is filled with a hydraulic fluid (also illustrated in FIG. 5). Pressure is applied to the volume of hydraulic fluid through the use of floating piston 39 by a gas space above the piston which maintains a desired pressure acting on the floating piston and the hydraulic fluid and limits the formation of gas bubbles within the hydraulic fluid volume.

Following is a description of the components which move with shaft 34 upon stroking movement of the strut. At its lower end, lower shaft 35 is affixed to rod end adapter 30 which is in turn affixed to external cylindrical return sleeve 24. Piston assembly 33 is fixed to lower shaft 34. The outer diameter of piston 36 seals against the inside surface of cylindrical shock body 54.

Figure 4C:
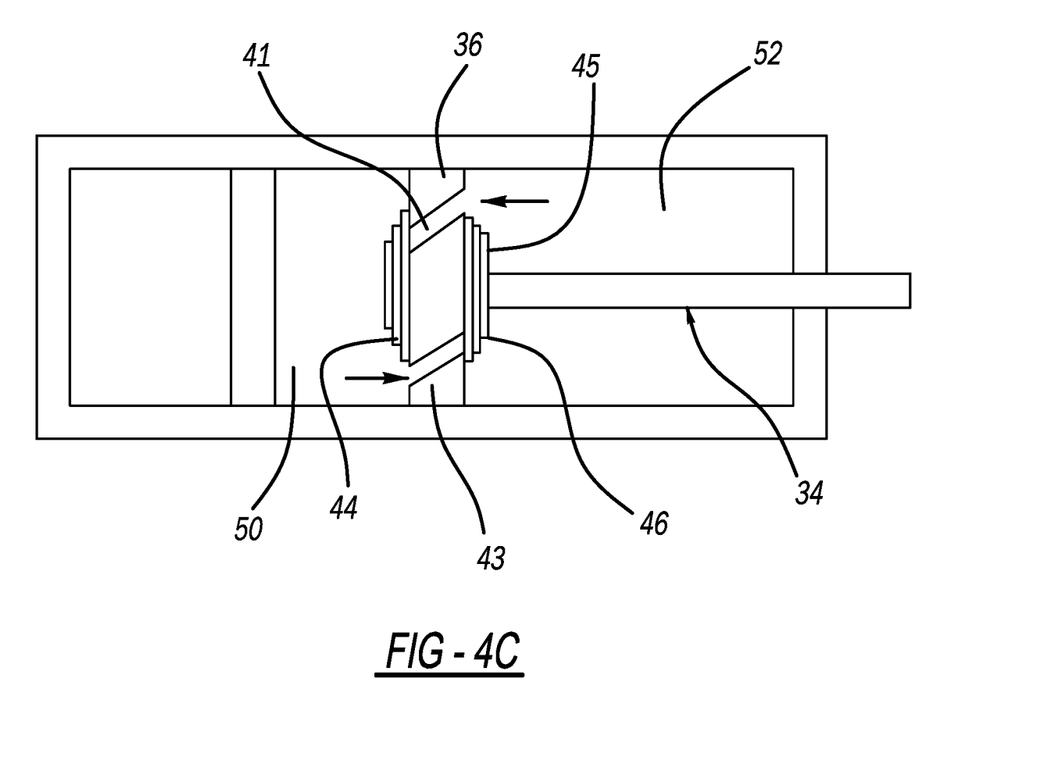
FIG. 4C is a diagrammatic illustration of features of the piston.
Figure 4D:
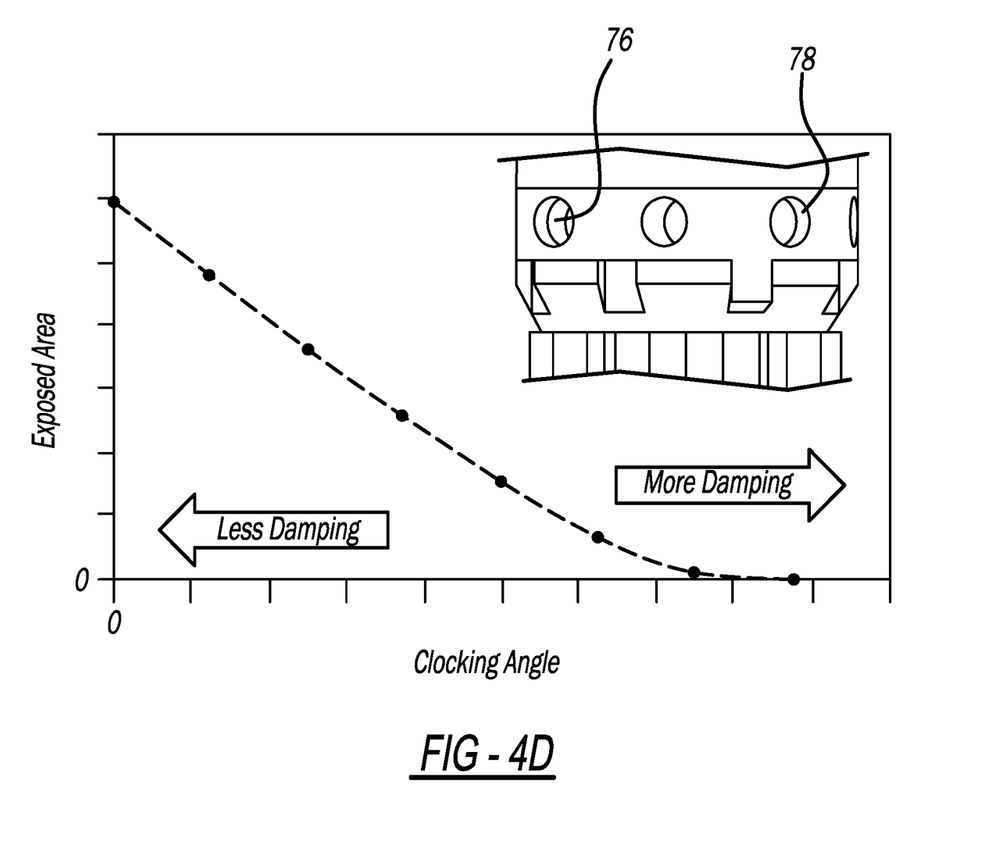
FIG. 4D is an enlargement of certain components shown in FIG. 4B and shows a graph relating to damping adjustment.

FIG. 4C provides a diagrammatic and simplified illustration of certain features of piston 36 (FIG. 4C does not depict the components identically as shown in other figures). Piston 36 isolates upper chamber 50 and lower chamber 52 (also shown in FIG. 6). These chambers are filled with a hydraulic fluid which shuttles between the chambers 50 and 52 as extension and retraction of EA unit 18 occurs. Piston 36 provides internal flow passages which communicate with opposing pairs of opposed shim stacks of Belleville type (or other types) spring washers, including rebound shim stack 44 on the upper side of piston 36, and compression shim stack 46 at the piston lower end. A first series of passageways 41 communicate with the lower space 52 of shock body 54 and are oriented in a skewed or inclined direction to communicate with the upper surface of the piston which is blocked by a sealing element of rebound shim stack 44. In this way, rebound shim stack 44 acts essentially as a check valve, allowing hydraulic fluid flow only when a difference in pressure exists with a positive net pressure below piston 36 exceeds a certain threshold. In a similar manner, inclined passageways 43 communicate the upper portion 50 of shock body 54 to compression shim stack 46 which also has a seal member and acts as a check valve in a manner similar to rebound shim stack 44, but in the opposite flow direction. The inclined orientation of passageways 41 and 43 enable closing of the passageways by the associated valve element while clearing the outside diameter of the opposite side sealing element. Thus rebound shim stack 44 and compression shim stack 46 act as pressure biased check valves operating in opposing directions and have different threshold differential pressure opening points based on dynamic considerations which are discussed below.

FIG. 4B provides an enlargement of components in the upper portion of the EA damper 18. As mentioned previously, piston 36 along with other features described below provide a controllable flow of hydraulic fluid between chambers 50 and 52 during stroking motion of EA unit 18. A path for hydraulic fluid flow between the upper and lower chambers 50 and 52 (in addition to a pressure-limited flow provided by shim stacks 44 and 46) is controlled by upper valve assembly 56. Lower shaft 34 is hollow with an internal passageway along its length and has apertures 45 exposed to lower chamber 52. Upper shaft 37 features a series of radial apertures 58 which can be closed or opened to provide a flow path of hydraulic fluid into upper chamber 50. This valving behavior is provided by the presence and movement of inertial mass 60 which is in the form of an annular sleeve surrounding shaft 34. The axial position of the inertial mass 60 is controlled by a series of elements including valve assembly seat 62 which is fixed to shaft 34, damping intensity sleeve 64, damping start spacer 66, damping sleeve 68, and inertial mass spring 70. Inertial mass spring 70 exerts an upward force on inertial mass 60, urging it to a position covering apertures 58 and thus limiting the flow of hydraulic fluid from lower chamber 52 to upper chamber 50. The upper position of mass 60 is set by shaft cap 72. Spring 70 and damping elements 64, 66 and 68 are provided to control the motion of inertial mass 60 in response to dynamic events, which will be described further.

With continued specific reference to FIGS. 4B, and 4D-4F, the operation of the components of valve assembly 56 which influence of the motion of inertial mass 60 will be further described. In order to tune the behavior of EA device 18, the motion of inertial mass 60 needs to be controlled in a precise manner. As mentioned previously, the position of inertial mass 60 along upper shaft 37 and in particular its position relative to the fluid flow paths provided by apertures 58 controls fluid flow through the apertures. The degree of overlap between mass 60 and apertures 58 changes the flow resistance of hydraulic fluid. For applications of the present invention, simply relying on the biasing provided by inertial mass spring 70 may not provide the desired dynamic response tuning desired. Even without movement of inertial mass 60 there is some fluid leakage through the small annular clearance between the inside diameter of inertial mass 60 and the outside diameter of upper shaft 37. As inertial mass 60 is displaced downwardly into damping sleeve 68 an enclosed volume of hydraulic fluid is formed inside valve assembly 56. When inertial mass 60 is displaced in a downward direction, an annular space is formed between the outer diameter of inertial mass 60 and the inside bore of damping sleeve 68 which provides a one leakage path for drainage of hydraulic fluid within the internal volume of valve assembly 56. As inertial mass 60 is displaced further downwardly into damping sleeve 68 in response to a dynamic event, the hydraulic fluid in that annular chamber is subject to increased pressure. A further controlled drainage of this confined hydraulic fluid is provided by radial apertures 76 through valve assembly seat 62.

Figure 4E:
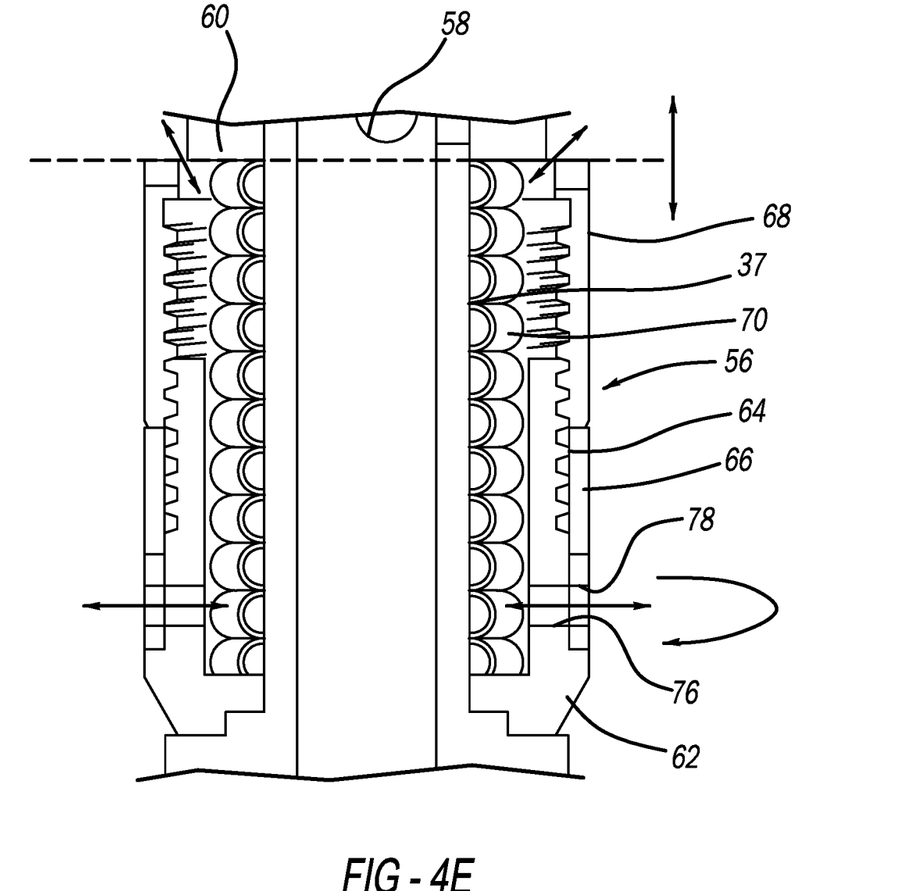
FIG. 4E is in enlargement of a section from FIG. 4B.
Figure 4F:
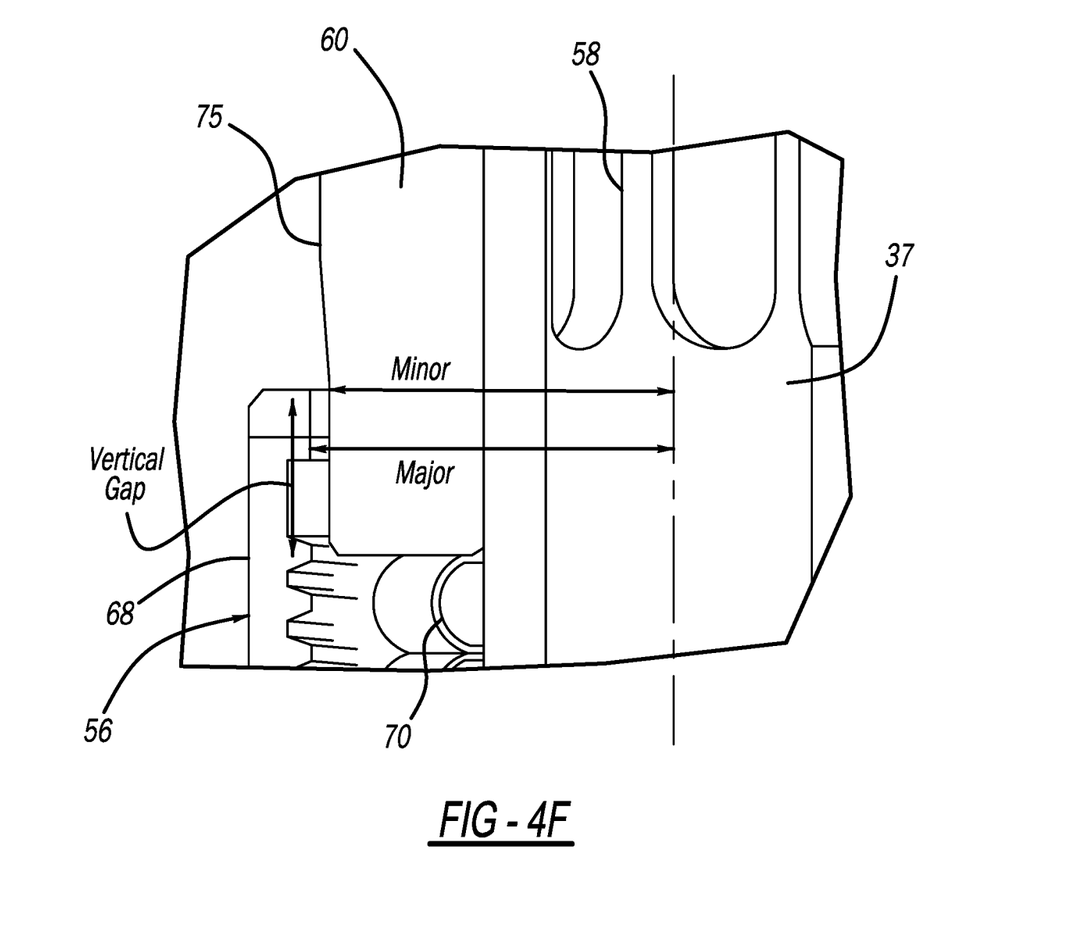
FIG. 4F is another enlargement of a section from FIG. 4B showing another form of damping adjustment.

A number of components of valve assembly 56 are provided to enable tuning of the system. First, as mentioned above, the radial clearance formed by inertial mass 60 and damping sleeve 68 provides a controlled leakage path for the draining of hydraulic fluid. As shown in FIGS. 4E and 4F, there is a threshold where inertial mass 60 begins to enter into the inside cavity of valve assembly 56. By adjusting the height of damping sleeve 68 as it is threaded into damping intensity sleeve 64, the point of this interaction can be controlled. Shims (not shown) can be provided to adjust the preload on inertial mass spring 70. Another tuning feature is best illustrated by FIG. 4F, which shows that the lower skirt portion of inertial mass 60 can have a slightly conical outer configuration such that the radial leakage gap between the mass and damping sleeve 68 varies with the extent of entry of the inertial mass into valve assembly 56. Another tuning function, referring to FIG. 4E, is provided by a separate damping intensity sleeve member 64 which has a series of radial apertures 78 and fits in a castelated manner with valve assembly seat 62. By changing the indexed position of damping intensity sleeve 64 relative to valve assembly seat 62, a varying opening area through the partially or fully overlapping radial apertures 76 and 78 is provided. The graph of FIG. 4D relates the clocking angle or relative position of sleeve 64 to seat 62 which has the effect of changing the effective fluid leakage flow area through the apertures.

Embodiments of the present invention described herein provide the ability to tune the system over a wide range, necessary for development system. These tuning capabilities are described above. However, in an EA device 18 designed for particular applications, these tuning capabilities may be dispensed with in favor of a system with fixed valving relationships. For example the two-part assembly of sleeves 64 and 68 and may be avoided in favor of a single component with a preset preload for spring 70. In such an alternative embodiment, valve assembly seat apertures 76 may have fixed flow areas based on testing and development activities.

A series of additional components are fixed to shock cap 20, including shock body 54. Linear bushings 22 and 28 allow shock body 54 and return sleeve 24 to translate relative to each other.

Upper sleeve bearing 22 is fixed to return sleeve 24 and acts as a bearing, allowing stroking of return sleeve 42 and further acts as a stop for return spring 26 which, at its lower end, is supported by lower sleeve bearing 28. Accordingly, spring 26 provides a preload for the unit, in this case urging the unit toward the collapsed condition as shown in FIGS. 2A and 2B.

Figure 5:
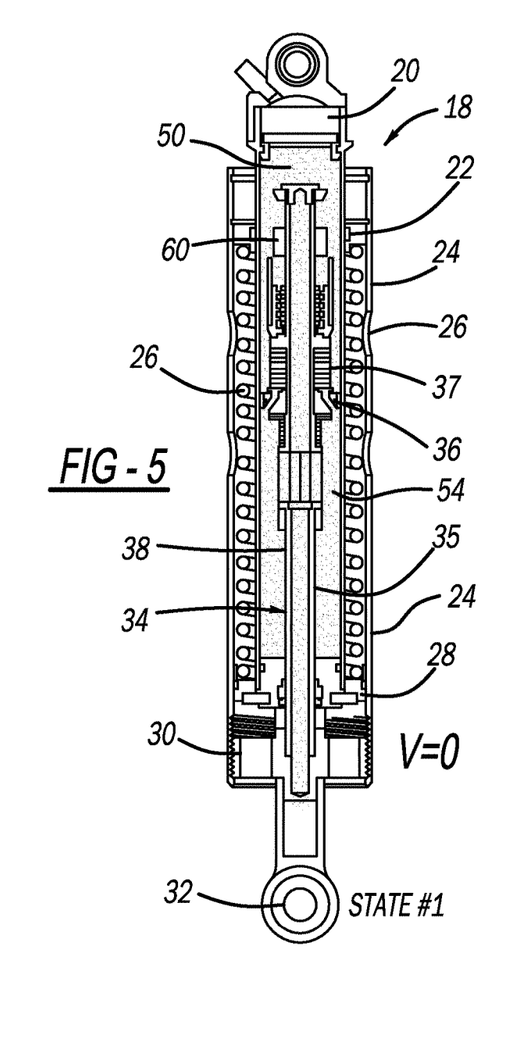
FIGS. 5 through 10 show the strut in various phases of dynamic actuation.

FIGS. 5 through 11 provide cross-sectional views through EA strut 18 in a dynamic event in which EA unit 14 is extended in response to a blast event or other force input, reaching a full stroke extended condition and then later returns to a rest-collapsed condition. Shading in these figures shows, in relative terms, fluid pressures in the various chambers in different states. FIGS. 5-11 designate a velocity vector "V" designating a relative velocity between the two relatively moving units of EA unit 14 i.e. those moving with shock cap 20 and those fixed to rod end 32. Vector V is expressed from a frame of reference wherein rod end 32 is stationary and V designates velocity of shock cap 20 (and components which move with it) relative to rod end 32 and components which move with it). A magnitude of V>0 designates and extending dynamic condition and V<0 designates a compressing dynamic condition. FIG. 5 corresponds with a State #1 which is a normal on-road condition (V=0, EA unit not extending). In this case, mass 60 is in a closed position and the chambers within the EA strut 18 are at an equilibrium, uniform pressure throughout the unit.

Figure 6:
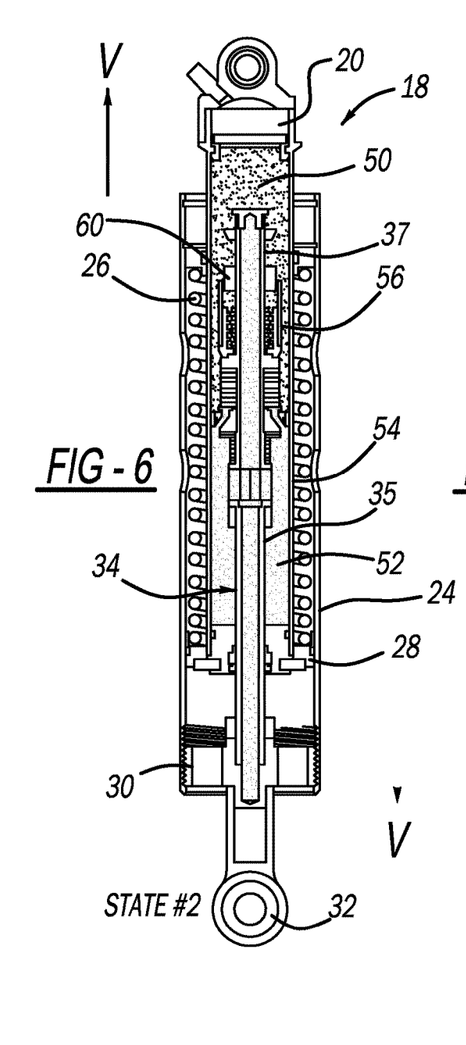

FIG. 6 corresponds with the State #2 which is just at the moment that a blast event or force input begins acting on the unit which urges shock cap 20 to be moved upward relative to rod end 32, extending the cylinder. The movement of shock cap 20 relative to rod end 32 is resisted by hydraulic fluid compressing in the unit. In this case, as shock cap 20 is drawn upwardly (V upward) piston 36 is being drawn in a downward direction relative to shock body 54, and pressure builds in lower chamber 52. This pressure is controlled by fluid flow from lower chamber 52 to upper chamber 50 by one or both of two primary flow paths; through the inside diameter of shaft 34 and radial apertures 58, or if the pressure difference reaches a threshold point which overcomes the force biasing acting on piston 36 provided by rebound shim stack 44, providing a leakage across the piston. In this way the maximum pressure in lower chamber 52 can be controlled and energy absorbing stroking of the unit can occur. In State #2 (FIG. 6), mass 60 displaces upwards in a global reference frame but downwards relative to shaft 34. Mass 60 is initially at rest when the rod accelerates upwards with the isolated structure due to energy absorbing forces across the device. Spring 70 supporting mass 60 is then compressed (due to relative motion between moving rod and resting mass) which accelerates the mass.

Figure 7:
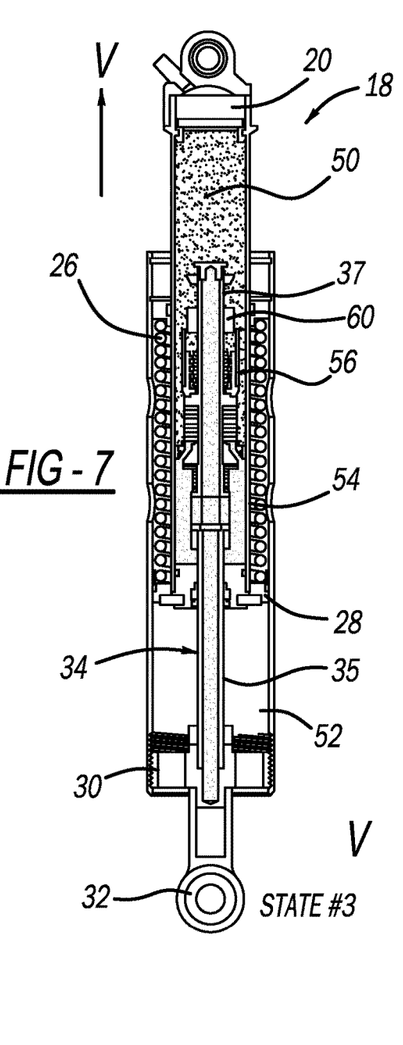

FIG. 7 shows State #3 which corresponds to a condition advanced in time from State #2 in which the vehicle was accelerated upwardly. In this case, inertial mass 60 strokes to a downward position against the biasing exerted by spring 70 and the restrictions imposed by hydraulic forces within damping sleeve 68, thus uncovering radial apertures 58. This provides a fluid path between the higher pressure lower chamber 52 into upper chamber 50 through shaft 34. In this condition, rebound shim stack 44 acting on piston 36 may be operated once it is preload is exceeded to relieve extreme pressure differences. At higher pressures (above the preload) shim stack 44 will vary between closed and open positions during operation.

Figure 8:
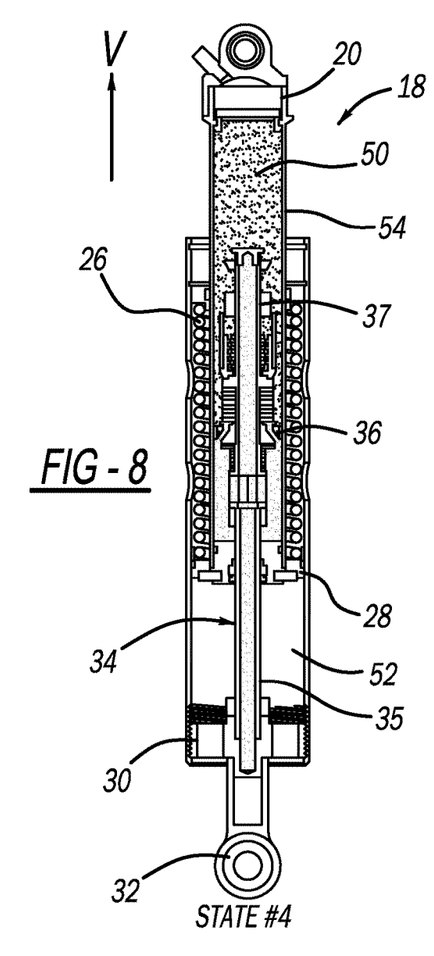

FIG. 8 corresponds to State #4 in which the associated vehicle begins decelerating. In this condition, there is a significant stroking of EA unit 18. Here mass 60 begins closing and pressure in the lower chamber 52 begins to drop as the stroke velocity slows.

Figure 9:
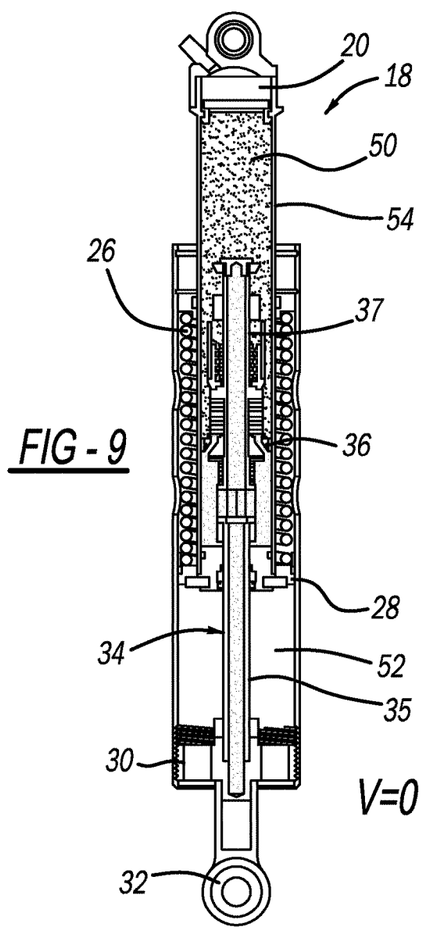

FIG. 9 corresponds with State #5 in which the floor the vehicle reaches the vehicle velocity (V=0). In this case, mass 60 is closed and the stroke of the unit is at a maximum.

Figure 10:
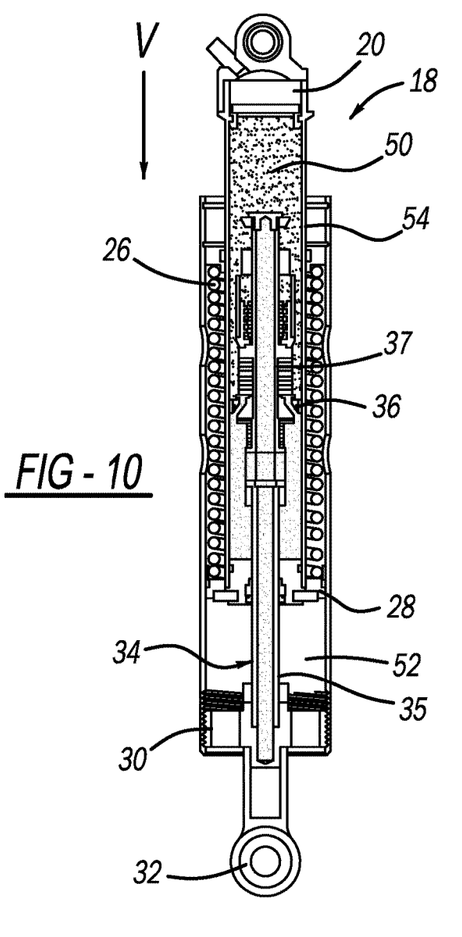

FIG. 10 shows State #6 which corresponds to the vehicle decelerating with gravity ("free fall") for most of the event outside of the initial blast and impact and return to ground, which are very brief compared to the "free fall" period. This state occurs after the floor has reached the vehicle velocity. Here energy stored in return spring 26 is released and EA unit 18 begins to return to its rest-collapsed state. In this condition mass 60 is closed and fluid flows across piston 36 due to through light loading exerted by compression shim stack 46.

Figure 11:
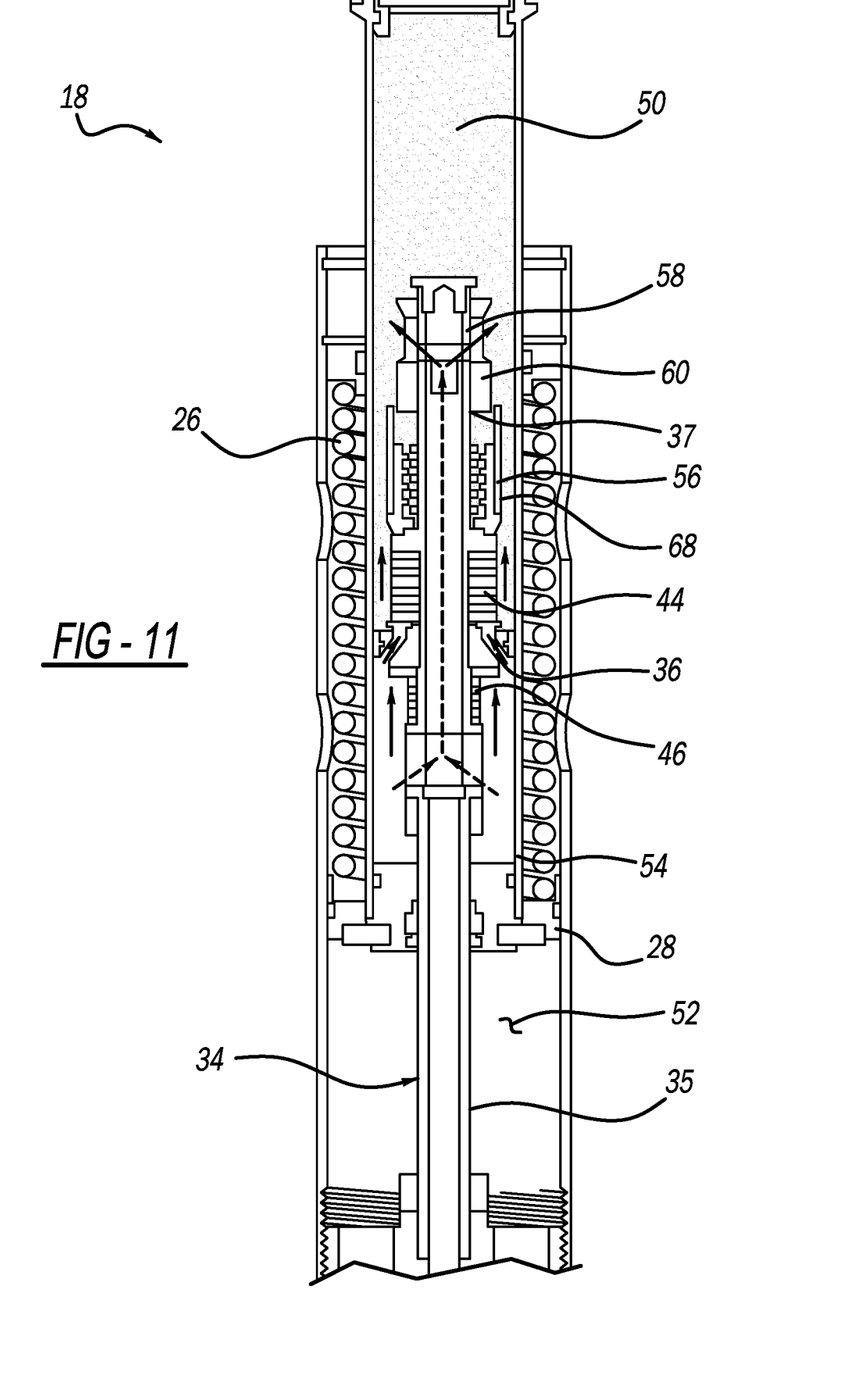
FIG. 11 shows a cross-sectional view of the strut with fluid flow paths illustrated with the strut in an extended condition.

FIG. 11 is another view showing the flow paths of hydraulic fluid in unit 18. The two primary fluid flow paths described previously are illustrated. One flow path being across piston 36 regulated by the shim stacks 44 and 46, and another flow path through the inside of shaft 34 through radial apertures 58 in the event that inertial mass 60 is stroked downward relative to its resting position.

Another feature of EA strut 18 in accordance with the present invention is its ability to provide high moment resistance and strength in reacting to bending loads. Referring back to FIG. 1, it is noted that, in their installed position in an associated vehicle, EA struts 18 are positioned in a skewed orientation relative to the vertical axis. In a dynamic event, loads acting through EA strut 18 are not purely aligned with the longitudinal axis of the unit and therefore dynamic bending loads are imposed due to this orientation and inertia of the device itself. The piston and cylinder arrangement and constraints including upper sleeve bearing 22 acting on shock body 54 help provide this capability.

Figure 12:
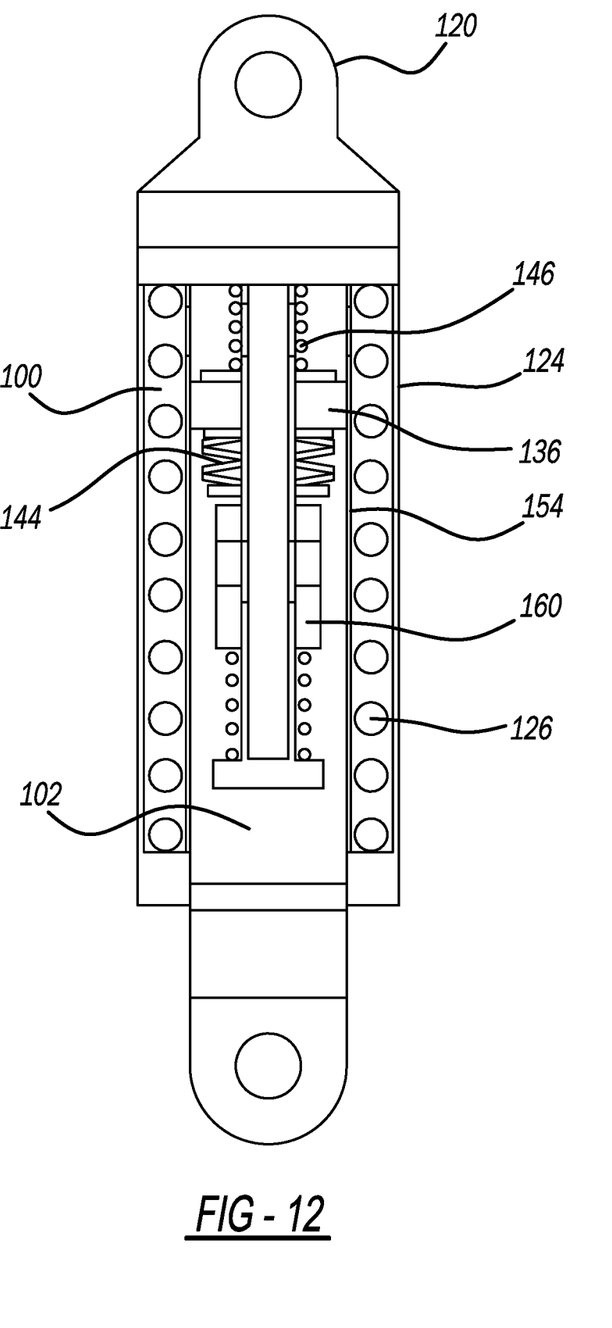
FIG. 12 is a cross-sectional schematic illustration of a strut unit in accordance with a second embodiment of the invention.

FIG. 12 provides a cross-sectional view of a second embodiment of an EA strut device 118 in accordance with the present invention. EA strut 118 is similar in functions to the configuration of strut 18 previously described except that the arrangement of certain components have been changed in their layout. Elements having similar configuration or functions are identified by reference numbers used previously with 100 added. In this configuration shock cap 120 is integrated with outer body or return sleeve 124. Rod end 132 is directly coupled to shock body 154. Optional return spring 126 is provided in the annular space between cylindrical shock body 154 and return sleeve 124. In this embodiment the annular space is enclosed and acts as part of a rebound chamber 100 (similar in function as provided by upper chamber 50), filled with hydraulic fluid. Compression chamber 102 is similar in function as lower chamber 52 of the prior embodiment. In this embodiment shaft 134 is cantilever supported and extends downwardly into compression chamber 102. Inertial valve assembly 156 and inertial mass 160 are suspended in compression chamber 102. Piston 136 includes rebound stack 144 and compression stack 146 (in this embodiment shown as a coil spring). EA strut 118 provides a more compact unit in terms of its linear length by providing the concentric folded or overlapping of chambers 100 and 102. In other respects EA strut 118 operates like the prior embodiment with the flow of hydraulic fluid between chambers 100 and 102 regulated by movement of inertial mass 160 and pressure relief provided by rebound stack 144 and compression stack 146.

While the above description constitutes the preferred embodiment of the present invention, it will be appreciated that the invention is susceptible to modification, variation and change without departing from the proper scope and fair meaning of the accompanying claims.

The invention claimed is:

1. An energy absorbing strut adapted to absorb energy between two components affixed to first and second ends of the strut comprising,
the first end coupled with an inner cylinder,
the second end connected with a hollow rod extending within the inner cylinder,
a piston carried by the rod having an outer surface sealing against an inside diameter of the inner cylinder and forming a compression chamber and a rebound chamber bounded by the piston, the rod having an internal passageway communicating with the compression chamber and the rebound chamber,
a valve assembly including an inertial mass carried by the rod movable axially on the rod between a closed position against an annular rod passageway in the rod and an open position opening the annular rod passageway and allowing the flow of a hydraulic fluid through the rod between the compression chamber and the rebound chamber, and a spring acting on the inertial mass biasing the inertial mass toward the closed position,
the energy absorbing strut used as part of an energy absorbing system for a vehicle wherein the first end is coupled to at least one of; a vehicle seat, a vehicle floor, and a vehicle cargo, and the second end is coupled with a hull of the vehicle.

2. The energy absorbing strut in accordance with claim 1, the valve assembly further comprising, a damping sleeve having an opening for receiving the inertial mass when the inertial mass moves from the closed position to the open position, the damping sleeve forming an annular internal chamber filled with the hydraulic fluid and an aperture for draining the hydraulic fluid from the internal chamber, the inertial mass moving into the damping sleeve exerting pressure on the hydraulic fluid in the internal chamber urging the hydraulic fluid to drain through the aperture, the spring and the damping sleeve combining to control motion of the inertial mass along the rod between the closed and the open positions.

3. The energy absorbing strut in accordance with claim 2 further comprising, the inertial mass having a tapered outer skirt received by a flange formed at an entrance opening of the internal chamber, a clearance between the tapered outer skirt and the flange having a variable dimension with the extent of insertion of the inertial mass within the internal chamber, the clearance providing a leakage path of the hydraulic fluid from the internal chamber as the inertial mass moves into the internal chamber.

4. The energy absorbing strut in accordance with claim 1 further comprising, the inertial mass and the rod passageway providing a range of flow areas for the flow of the hydraulic fluid through the rod between the closed and the open positions.

5. The energy absorbing strut in accordance with claim 1 further comprising, the piston having a first piston passageway between the compression chamber and the rebound chamber and a first spring stack having a sealing element to allow opening and closing movement based upon a pressure differential across the piston and the preload provided by the first spring stack, wherein the opening allows the hydraulic fluid to flow from the compression chamber to the rebound chamber independent of a flow of the hydraulic fluid across the valve assembly.

6. The energy absorbing strut in accordance with claim 5 further comprising, the piston having a second passageway between the compression chamber and the rebound chamber and a second spring stack having a sealing element to allow opening and closing movement based upon a pressure differential across the piston and the preload provided by the second spring stack wherein the opening allows the hydraulic fluid to flow from the rebound chamber to the compression chamber.

7. The energy absorbing strut in accordance with claim 1 further comprising, a return spring acting between the first end and the second end for urging the strut to a collapsed condition.

8. The energy absorbing strut in accordance with claim 1 wherein the energy absorbing system is a blast mitigation system for the vehicle wherein the first end is coupled to the vehicle floor.

9. The energy absorbing strut in accordance with claim 8 further comprising, a plurality of the energy absorbing struts affixed to the vehicle floor and the hull wherein upon a blast acting on the vehicle causing the vehicle hull to be displaced upwardly the energy absorbing struts are extended thereby providing isolation of blast effects transmitted to the vehicle floor.

10. The energy absorbing strut in accordance with claim 1 wherein the energy absorbing system is a blast or an impact mitigation system for the vehicle and the vehicle is one of; an aircraft, a watercraft, or a land vehicle.

11. The energy absorbing strut in accordance with claim 1 further comprising, the compression chamber and the rebound chamber are aligned in a co-linear orientation separated by the piston.

12. The energy absorbing strut in accordance with claim 11 further comprising, the piston defining an upper chamber forming the rebound chamber and a lower chamber forming the compression chamber, the valve assembly positioned within the rebound chamber.

13. The energy absorbing strut in accordance with claim 1 further comprising, the strut having a shock body and a return sleeve coaxially and axially overlapping defining an annular space forming at least a portion of the rebound chamber with the interior of the shock body forming the compression chamber.

14. The energy absorbing strut in accordance with claim 13 further comprising, the inertial mass supported by the rod in the compression chamber.

15. The energy absorbing strut in accordance with claim 13 further comprising, a return spring positioned within the annular space.

16. An energy absorbing strut adapted to absorb energy between two components affixed to first and second ends of the strut comprising,
the first end coupled with an inner cylinder,
the second end connected with a hollow rod extending within the inner cylinder, a piston carried by the rod having an outer surface sealing against an inside diameter of the inner cylinder and forming a compression chamber and a rebound chamber bounded by the piston, the rod having an internal passageway communicating with the compression chamber and the rebound chamber,
a valve assembly including an inertial mass carried by the rod movable axially on the rod between a closed position against an annular rod passageway in the rod and an open position opening the annular rod passageway and allowing the flow of a hydraulic fluid through the rod between the compression chamber and the rebound chamber, and
a spring acting on the inertial mass biasing the inertial mass toward the closed position,
the valve assembly further comprising, a damping sleeve having an opening for receiving the inertial mass when the inertial mass moves from the closed position to the open position, the damping sleeve forming an annular internal chamber filled with the hydraulic fluid and an aperture for draining the hydraulic fluid from the internal chamber, the inertial mass moving into the damping sleeve exerting pressure on the hydraulic fluid in the internal chamber urging the hydraulic fluid to drain through the aperture, the spring and the damping sleeve combining to control motion of the inertial mass along the rod between the closed and the open positions.

17. The energy absorbing strut in accordance with claim 16 further comprising, the inertial mass having a tapered outer skirt received by a flange formed at an entrance opening of the internal chamber, a clearance between the tapered outer skirt and the flange having a variable dimension with the extent of insertion of the inertial mass within the internal chamber, the clearance providing a leakage path of the hydraulic fluid from the internal chamber as the inertial mass moves into the internal chamber.

18. The energy absorbing strut in accordance with claim 16 further comprising, the inertial mass and the rod passageway providing a range of flow areas for the flow of the hydraulic fluid through the rod between the closed and the open positions.

19. The energy absorbing strut in accordance with claim 16 further comprising, the piston having a first piston passageway between the compression chamber and the rebound chamber and a first spring stack having a sealing element to allow opening and closing movement based upon a pressure differential across the piston and the preload provided by the first spring stack, wherein the opening allows the hydraulic fluid to flow from the compression chamber to the rebound chamber independent of a flow of the hydraulic fluid across the valve assembly.

20. The energy absorbing strut in accordance with claim 19 further comprising, the piston having a second passageway between the compression chamber and the rebound chamber and a second spring stack having a sealing element to allow opening and closing movement based upon a pressure differential across the piston and the preload provided by the second spring stack wherein the opening allows the hydraulic fluid to flow from the rebound chamber to the compression chamber.

21. The energy absorbing strut in accordance with claim 16 further comprising, a return spring acting between the first end and the second end for urging the strut to a collapsed condition.

22. The energy absorbing strut in accordance with claim 16 used as part of a blast mitigation system for a vehicle wherein the first end is coupled with to a vehicle floor and the second end is coupled with a hull of the vehicle.

23. The energy absorbing strut in accordance with claim 22 further comprising, a plurality of the energy absorbing struts affixed to the vehicle floor and the hull wherein upon a blast acting on the vehicle causing the vehicle hull to be displaced upwardly the energy absorbing struts are extended thereby providing isolation of blast effects transmitted to the vehicle floor.

24. The energy absorbing strut in accordance with claim 16 used as part of a blast or impact mitigation system for a vehicle including an aircraft, a watercraft, or a land vehicle a wherein the first end is coupled to a first point of the vehicle and the second end is coupled to a second point of the vehicle.

25. The energy absorbing strut in accordance with claim 16 further comprising, the compression chamber and the rebound chamber are aligned in a co-linear orientation separated by the piston.

26. The energy absorbing strut in accordance with claim 25 further comprising, the piston defining an upper chamber forming the rebound chamber and a lower chamber forming the compression chamber, the valve assembly positioned within the rebound chamber.

27. The energy absorbing strut in accordance with claim 16 further comprising, the strut having a shock body and a return sleeve coaxially and axially overlapping defining an annular space forming at least a portion of the rebound chamber with the interior of the shock body forming the compression chamber.

28. The energy absorbing strut in accordance with claim 27 further comprising, the inertial mass supported by the rod in the compression chamber.

29. The energy absorbing strut in accordance with claim 27 further comprising, a return spring positioned within the annular space.

* * * * *